US012802663B2

(12) United States Patent
Lee et al.

(10) Patent No.: US 12,802,663 B2
(45) Date of Patent: Nov. 17, 2026

(54) SYSTEM AND A METHOD FOR ADJUSTING A LEVEL OF LUMINANCE OF A DISPLAY

(71) Applicant: AUMOVIO Germany GmbH, Hannover (DE)

(72) Inventors: Chee Wei Lee, Singapore (SG); Fook Wai Lee, Singapore (SG)

(73) Assignee: AUMOVIO Germany GmbH, Frankfurt am Main (DE)

( * ) Notice: Subject to any disclaimer, the term of this patent is extended or adjusted under 35 U.S.C. 154(b) by 0 days.

(21) Appl. No.: 18/284,254

(22) PCT Filed: Dec. 22, 2021

(86) PCT No.: PCT/EP2021/087357

§ 371 (c)(1),
(2) Date: Sep. 26, 2023

(87) PCT Pub. No.: WO2022/207138

PCT Pub. Date: Oct. 6, 2022

(65) Prior Publication Data

US 2024/0161715 A1 May 16, 2024

(30) Foreign Application Priority Data

Mar. 31, 2021 (GB) ..................................... 2104606

(51) Int. Cl.
*G09G 5/10* (2006.01)
*G06V 10/25* (2022.01)

(52) U.S. Cl.
CPC ....... *G09G 5/10* (2013.01); *G09G 2320/0233* (2013.01); *G09G 2320/062* (2013.01); (Continued)

(58) Field of Classification Search
CPC .................. G09G 2320/062; G09G 2360/145
See application file for complete search history.

(56) References Cited

U.S. PATENT DOCUMENTS 5,859,921 A * 1/1999 Suzuki ................. G06V 40/168 382/257
9,952,658 B2 4/2018 Hosabettu et al.
(Continued)

FOREIGN PATENT DOCUMENTS

CN 110235171 9/2019
CN 110832575 2/2020
(Continued)

OTHER PUBLICATIONS

International Search Report and Written Opinion dated Apr. 26, 2022 from corresponding International patent application No. PCT/EP2021/087357.

(Continued)

*Primary Examiner* — Bipin Gyawali
(74) *Attorney, Agent, or Firm* — COZEN O'CONNOR

(57) ABSTRACT

The present disclosure relates to a system for adjusting a level of luminance of a display unit. The system comprises a display unit to display content. Further, the system comprises a capturing unit to capture image of front view of the display unit. Furthermore, the system comprises a computing unit. The computing unit is configured to receive the image from the capturing unit. Further, the computing unit is configured to determine one or more target regions from plurality of regions in the image. The one or more target regions are determined based on weightage assigned to each of the plurality of regions. Furthermore, the computing unit determines effects of light incident on the one or more target regions. Thereafter, the computing unit adjusts the display of the content based on the effects of light.

14 Claims, 7 Drawing Sheets

(52) U.S. Cl.
CPC ............... *G09G 2320/0626* (2013.01); *G09G 2320/066* (2013.01); *G09G 2320/0666* (2013.01); *G09G 2360/145* (2013.01)

(56) References Cited

U.S. PATENT DOCUMENTS

| | | | | |
|---|---|---|---|---|
| 10,482,350 | B2 * | 11/2019 | Liu | B60Q 9/00 |
| 10,816,939 | B1 | 10/2020 | Coleman | |
| 10,922,797 | B1 * | 2/2021 | Peana | G09G 3/20 |
| 2004/0103111 | A1 * | 5/2004 | Miller | H04N 1/00331 707/999.102 |
| 2006/0055657 | A1 * | 3/2006 | Koyama | G09G 5/28 345/102 |
| 2007/0070087 | A1 * | 3/2007 | Sato | H04N 1/32101 348/E5.045 |
| 2011/0181541 | A1 | 7/2011 | Kuo | |
| 2012/0019152 | A1 | 1/2012 | Barnhoefer et al. | |
| 2015/0070337 | A1 | 3/2015 | Bell et al. | |
| 2015/0117771 | A1 * | 4/2015 | Sasaki | H04N 1/628 382/164 |
| 2015/0187330 | A1 | 7/2015 | Yang | |
| 2016/0266643 | A1 * | 9/2016 | Martensson | G06V 40/193 |
| 2016/0358582 | A1 * | 12/2016 | Lee | G06F 3/1446 |
| 2017/0047046 | A1 | 2/2017 | Tam | |
| 2017/0263192 | A1 | 9/2017 | Luna et al. | |
| 2018/0260961 | A1 * | 9/2018 | Narita | H04N 23/60 |
| 2019/0385571 | A1 * | 12/2019 | Nagasawa | G09G 3/20 |
| 2020/0090626 | A1 * | 3/2020 | Chen | G09G 5/10 |
| 2020/0219464 | A1 * | 7/2020 | Callway | G06F 3/013 |
| 2022/0382053 | A1 * | 12/2022 | Yu | G02B 27/017 |
| 2023/0134146 | A1 * | 5/2023 | Lee | G09G 3/20 345/207 |
| 2024/0135602 | A1 * | 4/2024 | Ji | G06T 11/00 |
| 2025/0225629 | A1 * | 7/2025 | Kim | G06T 5/80 |

FOREIGN PATENT DOCUMENTS

| | | | |
|---|---|---|---|
| CN | 110890078 | A | 3/2020 |
| CN | 112037732 | | 12/2020 |
| EP | 3044778 | A1 | 7/2016 |
| EP | 3559900 | | 8/2021 |
| JP | H0933217 | | 2/1997 |

OTHER PUBLICATIONS

Search Report dated Sep. 14, 2021 from corresponding GB patent application No. GB2104606.5.

Office Action dated Aug. 13, 2024 from corresponding Korean patent application No. 10-2023-7037062.

Office Action of corresponding European Patent Application No. EP 21 844 990.8, dated Feb. 18, 2025.

Office Action of corresponding Chinese Patent Application No. 202180097995.6 dated Mar. 17, 2026.

* cited by examiner

SYSTEM AND A METHOD FOR ADJUSTING A LEVEL OF LUMINANCE OF A DISPLAY

CROSS REFERENCE TO RELATED APPLICATIONS

This U.S. patent application claims the benefit of PCT patent application No. PCT/EP2021/087357, filed Dec. 22, 2021, which claims the benefit of United Kingdom patent application No. GB 2104606.5, filed Mar. 31, 2021, both of which are hereby incorporated by reference.

TECHNICAL FIELD

The present disclosure generally relates to field of controlling display units. More particularly, the present disclosure relates to a system and a method for adjusting a display of content for a user based on effects of light incident on the user.

BACKGROUND

Display devices provide visual presentation of data and images. The display devices may be part of vehicles, electronic appliances, and the like. The display devices are playing a prominent role to provide useful information to a user in many applications. Light from nature effects a display of content from the display devices in some applications. FIG. 1 shows an exemplary environment 100 illustrating effect of a light 101 on a display 104, known to a person skilled in the art. When the light 101 from sun is incident on a user, the light 101 is scattered. When the light 101 is scattered on an eye 102 of the user, a scattered light 103 is distributed onto retina of the eye. This leads to additional luminance on the eye. The additional luminance is termed as veiling glare. The veiling glare reduces contrast of the display 104 viewed by the user 102. The veiling glare causes a change in perception of the display 104 to the user. For example, the scattered light 103 may cause a blurred vision. The user 102 may perceive a content on the display 104 differently because of the blurred vision. For example, a list of contact numbers with names may be displayed on the display 104. The user 102 may perceive digit 8 in a contact number as digit 0, due to the blurred vision.

Conventional techniques teach to compensate the veiling glare by increasing brightness of the display 104. The brightness is increased based on an output provided by an ambient light sensor. The ambient light sensor is an additional component assembled in the display 104. Implementation of such sensors involves additional cost. Further, the ambient light sensor may be placed at a distance from the user 102. Hence, the ambient light sensor may not accurately measure the light 101 that illuminates particularly on the eye of the user 102. There is therefore, a need for a system which is able to accurately compensate veiling glare in a cost efficient manner.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

In an embodiment, the present disclosure discloses a system for adjusting a level of luminance of a display. The system comprises a display unit configured to display a content. Further, the system comprises a capturing unit configured to capture an image of a front view of the display unit. Furthermore, the system comprises a computing unit coupled to the display unit and the capturing unit. The computing unit is configured to receive the image from the capturing unit. Further, the computing unit is configured to determine one or more target regions from a plurality of regions in the image. The one or more target regions are determined based on a weightage assigned to each of the plurality of regions. Furthermore, computing unit is configured to determine effects of light incident on the one or more target regions. Thereafter, the computing unit is configured to adjust the level of luminance of the display based on the effects of the light. This aspect of the disclosure provides a system for adjusting a level of luminance of a display according to an ambient lighting surrounding the display. Therefore, compensation of veiling glare is achieved.

In an embodiment, the computing unit is configured to adjust the level of luminance of the display comprising adjusting a brightness of the display, a contrast of the display, a colour of the display, a grey level of colour components of the display or any combination thereof. This aspect of the disclosure yields a system to accurately compensate veiling glare by adjusting a level of luminance of a display according to an ambient lighting surrounding the display.

In an embodiment, the computing unit (207) is configured to determine the one or more target regions from the plurality of regions by assigning the weightage based on a priority associated with the plurality of regions, and selecting regions from the plurality of regions with the weightage greater than a pre-defined threshold value as the one or more target regions. The level of luminance of the display is adjusted according to regions surrounding the display.

In an embodiment, the weightage assigned to a region from the plurality of regions is greater when the priority of the region is higher than other regions from the plurality of regions. This aspect of the disclosure determines a selection of regions surrounding the display is categorised according to priority to accurately measure the ambient lighting surrounding the display.

In an embodiment, the priority is based on at least identification of a face of a user and one or more facial organs of the user.

In an embodiment, the effects of the light comprises an intensity of the light, distribution of the light on the one or more target regions, aperture of iris in an eye of the user or any combination thereof.

In an embodiment, the computing unit is further configured to analyse context information related to an automobile; and determine a requirement of adjusting the level of luminance of the display based on the analysis.

In an embodiment, the context information comprises a direction of the automobile, a speed of the automobile, a time data, a location of the automobile or any combination thereof.

In an embodiment, the computing unit is further configured to adjust the level of luminance of the display based on one or more preferences of a user.

In an embodiment, the one or more preferences of the user comprises an age of the user, conditions of the user, a display mode preferred by the user or any combination thereof.

In an embodiment, the present disclosure discloses a method for adjusting a level of luminance of a display using a system as disclosed herein. The method comprises displaying a content, by the display unit. Further, the method comprises capturing, by the capturing unit, an image of a front view of the display unit. Further, the method comprises receiving, by the capturing unit, the image from the capturing unit. Further, the method comprises determining, by the capturing unit, one or more target regions from a plurality of regions in the image. The one or more regions are determined based on a weightage assigned to each of the plurality of regions. Furthermore, the method comprises determining, by the capturing unit, effects of light incident on the one or more target regions. Thereafter, the method comprises adjusting, by the capturing unit, the level of luminance of the display based on the effects of the light. This aspect of the disclosure provides a method for adjusting a level of luminance of a display according to an ambient lighting surrounding the display. Therefore, compensation of veiling glare is achieved.

In an embodiment, adjusting the level of luminance of the display comprises adjusting a brightness of the display, a contrast of the display, a colour of the display, a grey level of colour components of the display or any combination thereof. This aspect of the disclosure yields a method of adjusting the level of luminance of the display to accurately compensate veiling glare.

In an embodiment, determining the one or more target regions from the plurality of regions comprises assigning the weightage based on a priority associated with the plurality of regions, and selecting regions from the plurality of regions with the weightage greater than a pre-defined threshold value as the one or more target regions.

In an embodiment, the weightage assigned to a region from the plurality of regions is greater when the priority of the region is higher than other regions from the plurality of regions.

In an embodiment, the priority is based on at least identification of a face of a user and one or more facial organs of the user.

In an embodiment, the effects of the light comprises an intensity of the light, distribution of the light on the one or more target regions, aperture of iris in an eye of a user or any combination thereof.

In an embodiment, the method further comprises analysing context information related to an automobile, and determining a requirement of adjusting the level of luminance of the display based on the analysis, by the computing unit.

In an embodiment, the context information comprises direction of the automobile, speed of the automobile, a time data, a location of the automobile or any combination thereof.

In an embodiment, adjusting level of luminance of the display is based on one or more preferences of a user.

In an embodiment, the one or more preferences of the user comprises an age of the user, conditions of the user, and a display mode preferred by a user or any combination thereof.

As used in the present disclosure, the term "display unit" is a unit configured to display a content to a user. For example, the display unit may be implemented in a vehicle to display the content as map, contact list, fuel indications, and the like. In another example, the display unit may be associated with a television, configured to display news, entertainment content, and the like.

The term "capturing unit" may refer to an imaging device or camera configured to capture the image in front view of the display unit. For example, when the display unit is associated with a vehicle, the capturing unit may be installed in the interior of the vehicle. In another example, when the display unit is associated with a television, the capturing unit may be installed in the household environment.

The term "image" may be defined as a picture of an environment in front of the display unit. For example, the image may be a picture of a driver and a passenger sitting next to the driver.

The term "weightage" may be defined as a value assigned to each region from a plurality of regions in the image captured by the capturing unit, based on the effects of light.

The term "one or more target regions" may be refer to one or more regions in the image with greater weightage than other regions in the image. The weightage is assigned based on the effects of the light, to measure illuminance at required regions in the image. The display of the content is adjusted based on the effects of the light on the one or more target regions.

The term "effect of the light" may refer to an impact of the light on the user which may cause a change in perception of the displayed content to the user. The effects of light may comprises an intensity of the light, distribution of the light on the one or more target regions, aperture of iris in an eye of the user or any combination thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, byway of example only, with reference to the accompanying figures wherein like reference numerals represent like elements and in which:

Figure 1:
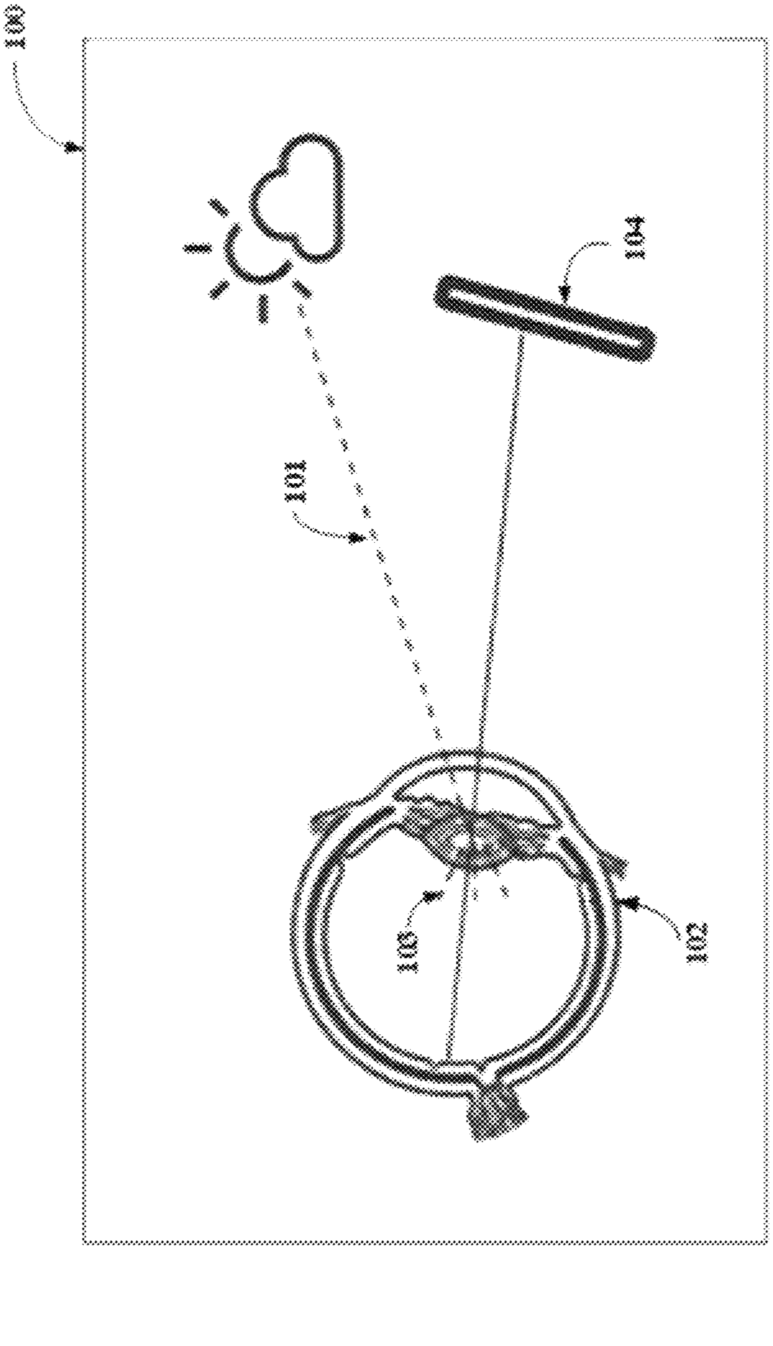
FIG. 1 shows an exemplary environment illustrating effect of a light on a display.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown byway of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a system for adjusting a level of luminance of a display. A display unit is configured to display a content to the user. A perception of the displayed content may change for the user, due to incidence of ambient light on the user. The system aims to overcome the problem of change of perception of the displayed content to the user. A capturing unit is configured to capture an image of a front view of the display unit. A computing unit is configured to determine target regions in the image. The target regions are determined based on a weightage assigned to regions in the image. Further, the computing unit is configured to determine effects of the light incident on the target regions. Further, the computing unit is configured to adjust the level of luminance of the based on the effects of the light. Since the weightage of the target regions is considered in the present disclosure, a measurement of illuminance is at required regions and is accurate. Further, the present disclosure uses image processing techniques for determining the effects of the light rather than light sensors. Hence, accuracy in determining the effects of the light is increased. Also, additional cost of the light sensors is reduced.

Figure 2A:
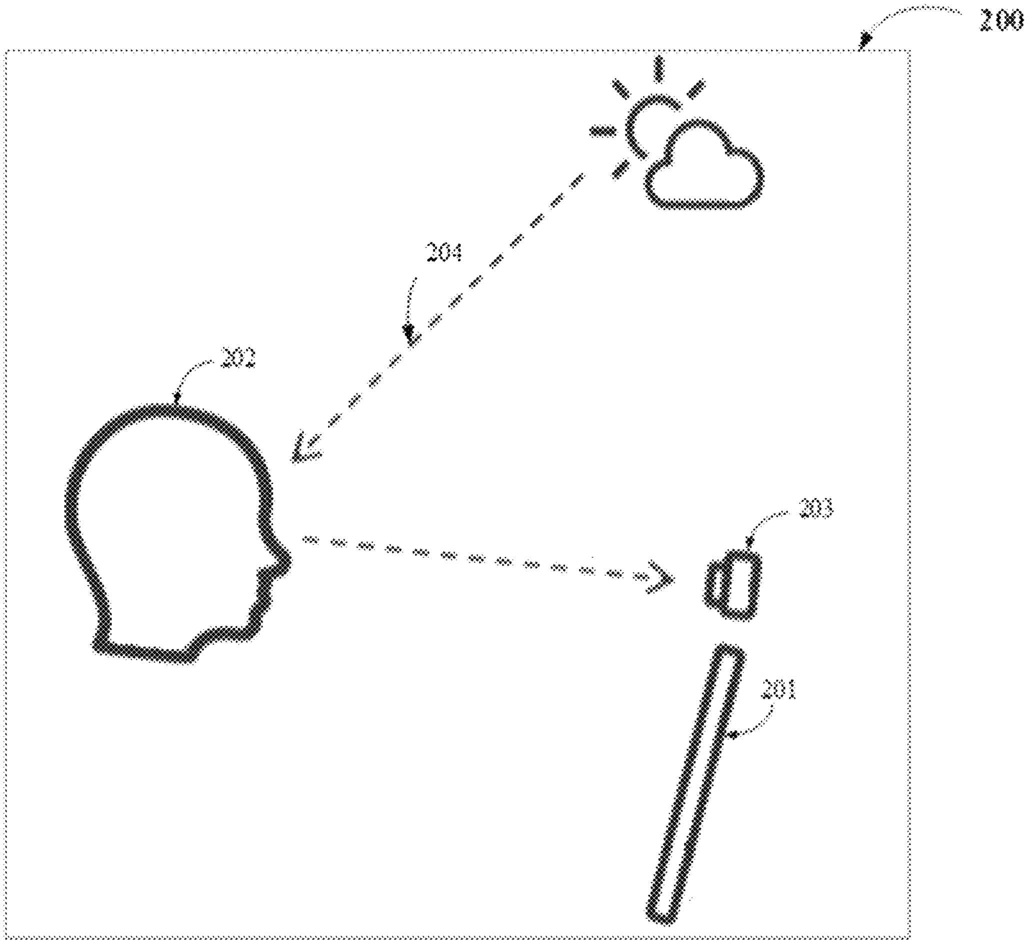
FIGS. 2A and 2B illustrate exemplary environment for adjusting a display of a content for a user, in accordance with some embodiments of the present disclosure.

FIG. 2A illustrates exemplary environment 200 for adjusting a display of a content for a user, in accordance with some embodiments of the present disclosure. The exemplary environment 200 comprises a display unit 201, a user 202, and a capturing unit 203. The display unit 201 may be configured to display a content to the user 202. In an example, the display unit 201 may be associated with a vehicle. In that case, the exemplary environment 200 may be interior of the vehicle. The vehicle may be a car, an aircraft, and the like, which implements a display unit. The display unit 201 may be a screen of an infotainment system of the vehicle. The user 202 may be a driver of the vehicle, a passenger of the vehicle, and the like. The content to the user 202 may be information such as map, rear obstacle image, music playlist, contact list, and the like. In another example, the display unit 201 may be associated with a television, configured to display news, entertainment content, and the like. In that case, the exemplary environment 200 may be a household environment. The capturing unit 203 may be configured to capture an image of a front view of the display unit 201. The front view may cover the driver of the vehicle, a passenger sitting next to the driver, and the like. In an embodiment, the capturing unit 203 may be a camera. A person skilled in art may appreciate that other kinds of capturing unit may be used (e.g., thermal cameras, IR cameras, etc). The capturing unit 203 may be placed such that entire front view of the display unit 201 is covered. An exemplary location of the capturing unit 203 is illustrated in FIG. 2A. A person skilled in the art will appreciate the capturing unit 203 can be placed at any other locations such that the entire front view is covered. For example, the capturing unit 203 may be located below or above an infotainment system associated with the vehicle. In an embodiment, when the display unit 201 is implemented in the vehicle, the capturing unit 203 may be an existing driver monitoring camera. The driver monitoring camera may be configured to monitor alertness of a driver of the vehicle by detecting signs of drowsiness, distraction, and the like. A person skilled in the art will appreciate that the driver monitoring camera is known, and thus not explained in detail here. A light 204 may be incident on the user 202. In an example, the light 204 may be from the sun. In another example, the light 204 may be from front lights of a vehicle approaching from opposite direction. In another example, the light 204 may be incident from sources other than intended for the display. For example, the light 204 may be incident from streetlights.

Figure 2B:
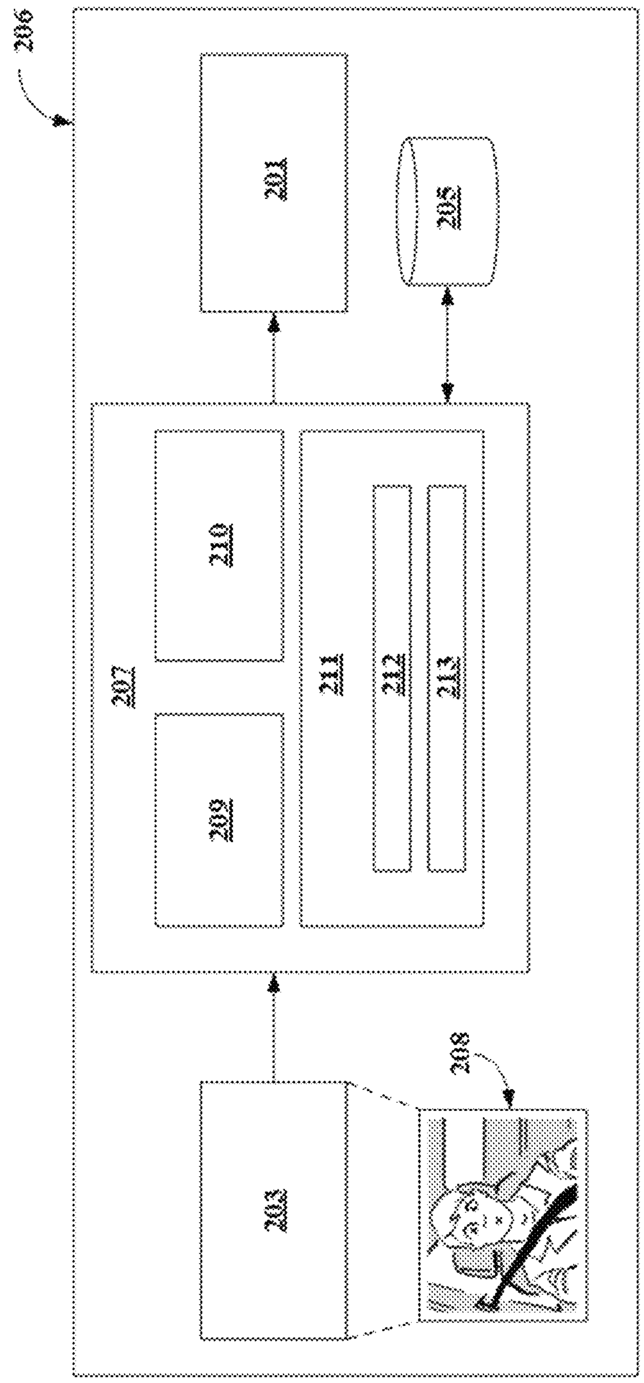

Reference is now made to FIG. 2B illustrating a system 206 for adjusting a display of a content for the user 202, in accordance with some embodiments of the present disclosure. The system 206 comprises the display unit 201, the capturing unit 203, and a computing unit 207. The computing unit 207 may be configured to receive an image 208 from the capturing unit 203. The image 208 is a front view of the display unit 201. In FIG. 2B, the display unit 201 is associated with a vehicle. The computing unit 207 may be coupled with the display unit 201 and the capturing unit 203. In an example, when the display unit 201 is associated with a vehicle, the computing unit 207 may be an electronic control unit of the vehicle. In another example, the computing unit 207 may be an embedded unit of electronic appliances. In another example, the computing unit 207 may be a cloud-based server in communication with the display unit 201 and the capturing unit 203. The computing unit 207 may be configured to determine one or more target regions from a plurality of regions in the image 208. The one or more target regions may be determined based on a weightage assigned to each of the plurality of regions. Further, the computing unit 207 is configured to determine effects of the light 204 incident on the one or more target regions. Furthermore, the computing unit 207 may be configured to adjust the level of luminance of the display of the content for the user 202 based on the effects of the light 204. The effects of the light 204 may comprise at least one of, an intensity of the light 204, distribution of the light 204 on the one or more target regions, and aperture of iris in an eye of the user 202.

Figure 3:
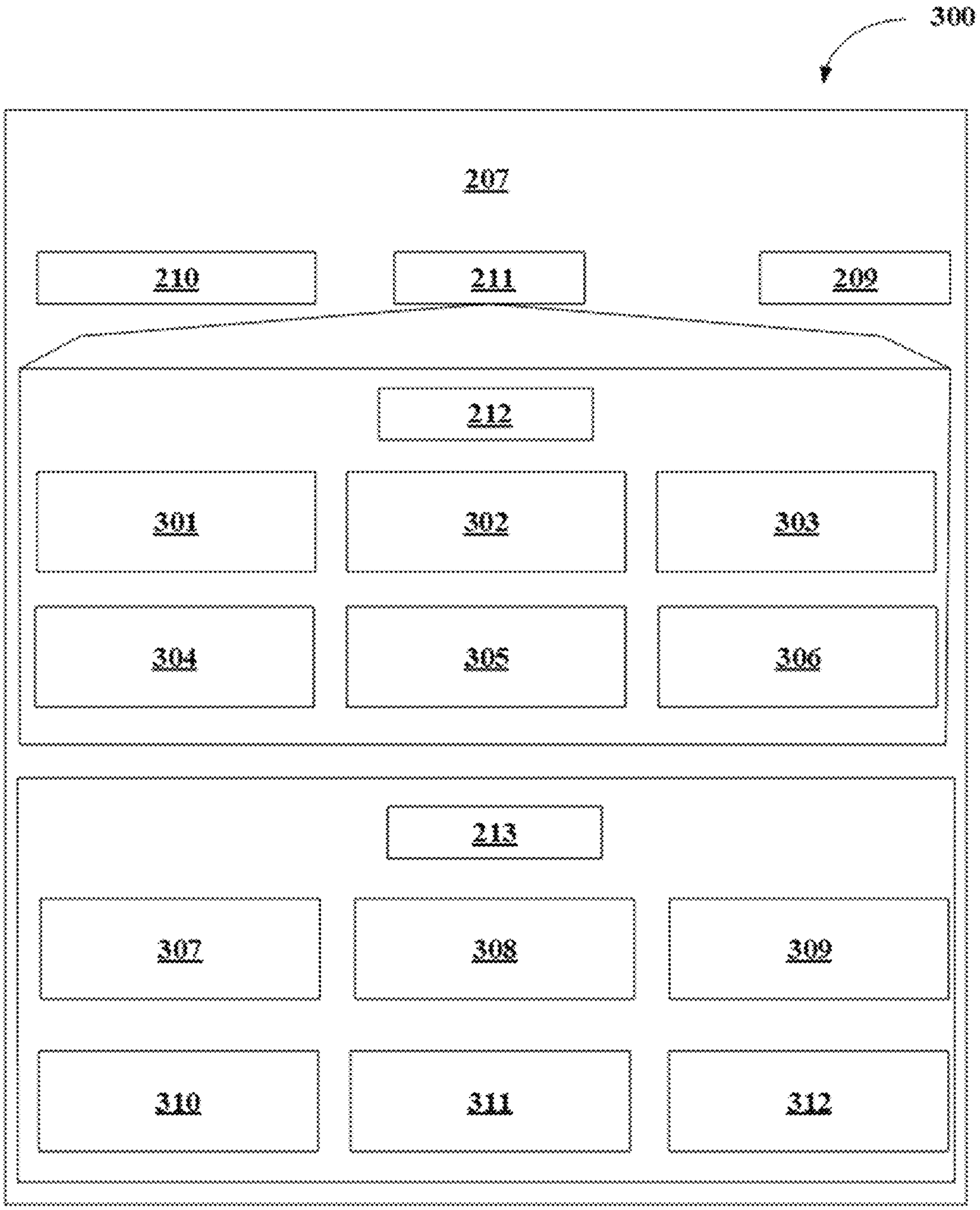
FIG. 3 illustrates an internal architecture of a computing unit for adjusting a display of a content for a user, in accordance with some embodiments of the present disclosure.

The computing unit 207 may include Central Processing Units 209 (also referred as "CPUs" or "one or more processors 209"), Input/Output (I/O) interface 210, and a memory 211. In some embodiments, the memory 211 may be communicatively coupled to the processor 209. The memory 211 stores instructions executable by the one or more processors 209. The one or more processors 209 may comprise at least one data processor for executing program components for executing user or system-generated requests. The memory 211 may be communicatively coupled to the one or more processors 209. The memory 211 stores instructions, executable by the one or more processors 209, which, on execution, may cause the one or more processors 209 to adjust the level of luminance of the display of the content for the user 202. In an embodiment, the memory 211 may include one or more modules 213 and data 212. The one or more modules 213 may be configured to perform the steps of the present disclosure using the data 212, to adjust the level of the display of the content for the user 202. In an embodiment, each of the one or more modules 213 may be a hardware unit which may be outside the memory 211 and coupled with the computing unit 207. As used herein, the term modules 213 refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 213 when configured with the described functionality defined in the present disclosure will result in a novel hardware. Further, the I/O interface 210 is coupled with the one or more processors 209 through which an input signal or/and an output signal is communicated. For example, the computing unit 207 may receive the image 208 from the capturing unit 203 via the I/O interface 210. The computing unit 207 may communicate with the display unit 201 via the I/O interface 210 to provide instruction for adjusting the level of luminance of the display of the content for the user 202. In an embodiment, the computing unit 207, to adjust the level of luminance of the display of the content for the user 202, may be implemented in a variety of computing systems, such as a laptop computer, a desktop computer, a Personal Computer (PC), a notebook, a smartphone, a tablet, e-book readers, a server, a network server, a cloud-based server and the like. An internal architecture 300 of the computing unit 207 to adjust the level of luminance of the display of the content for the user 202 is illustrated using FIG. 3, in accordance with some embodiments of the present disclosure.

In one implementation, the modules 213 may include, for example, an input module 307, a region determination module 308, a light effects determination module 309, a display adjust module 310, an analysis module 311, and other modules 312. It will be appreciated that such aforementioned modules 213 may be represented as a single module or a combination of different modules. In one implementation, the data 212 may include, for example, input data 301, weightage data 302, region data 303, light effects data 304, display data 305, and other data 306.

In an embodiment, the input module 307 may be configured to receive the image 208 of a front view of the display unit 201. The capturing unit 203 may be configured to capture the image 208. The input module 307 may be configured with the capturing unit 203. In an example, when the display unit 201 is associated with a vehicle, the front view of the display unit 201 may comprise a driver, a person next to the driver, a seatbelt, and the like. In another example, when the display unit 201 is associated with a television, the front view of the display unit 201 may comprise one or more users, one or more objects, and the like. In such embodiments, the input module 307 may be configured to receive one or more images of the front view of the display unit 201. In an embodiment, the input module 307 may receive the image 208 at pre-defined time intervals. In another embodiment, the input module 307 may receive the image 208 upon receiving an indication from the user 202. For example, the user 202 may provide the indication to the input module 307 when a readability of the content displayed on the display unit 201 is less, due to incidence of the light 204. The image 208 may be stored as the input data 301 in the memory 211. In an embodiment, the input module 307 may pre-process the image 208. Pre-processing may include, but is not limited to, compressing the image 208, removing noises, normalizing, increasing resolution, changing format and the like.

In an embodiment, the region determination module 308 may be configured to receive the image 208 from the input module 307. The region determination module 308 may determine the one or more target regions from the plurality of regions in the image 208. The one or more target regions may be determined based on a weightage assigned to each of the plurality of regions. The weightage may be assigned based on a priority associated with the plurality of regions. The priority associated with the plurality of regions may be based on effects of the light 204 on the plurality of regions. The priority may be higher when the effects of the light 204 is greater. For example, an eye of the user 202 is highly affected by incident light. Hence, region with the eye may have a higher priority. The priority may be lower when the effects of the light 204 is lower. For example, region with a seatbelt worn by the user 202 may have a lower priority. Further, the region determination module 308 may select regions from the plurality of regions with the weightage greater than a pre-defined threshold value as the one or more target regions. The weightage assigned to a region from the plurality of regions is greater when the priority of the region is higher than other regions from the plurality of regions. The priority may be based on at least identification of the face of the user 202 and one or more facial organs of the user 202. For example, the plurality of regions in the image 208 may comprise a body of the user 202, a seatbelt of a vehicle, and the like. The light 204 may affect a face of the user 202. More particularly, the light 204 may affect vision of the user 202. The effect may change a perception of the content displayed on the display. For example, the content displayed on the display unit 201 may be text. The user 202 may perceive characters in the text differently due to the effect of the light 204 on vision of the user 202. The eyes of the user 202 may have a priority higher than the seatbelt. The weightage assigned to a region in the image 208 associated with the eyes of the user 202 may be greater than weightages of other regions from the plurality of regions. Hence, the one or more target regions may be the eyes of the user 202. The weightage assigned to the plurality of regions may be stored as the weightage data 302 in the memory 211. The one or more target regions may be stored as the region data 303 in the memory 211.

In an embodiment, the light effects determination module 309 may be configured to receive the one or more target regions in the image 208 from the region determination module 308. Further, the light effects determination module 309 may be configured to determine effects of the light 204 incident on the one or more target regions. The effects of the light 204 may comprise at least one of, an intensity of the light 204, distribution of the light 204 on the one or more target regions, and aperture of iris in an eye of the user 202. The light effects determination module 309 may use image processing techniques to determine the effects of the light 204 on the one or more target regions. For example, an intensity of the light 204 may be determined from a histogram of the image 208. A person skilled in the art will appreciate that any known image processing techniques may be used to determine each of the effects of the light 204. The effects of the light 204 incident on the one or more target regions may be stored as the light effects data 304 in the memory 211.

In an embodiment, the display adjust module 310 may be configured to receive the light effects data 304 from the light effects determination module 309. The display adjust module 310 may be configured to adjust the level of luminance of the content displayed to the user 202 based on the effects of the light 204. The display adjust module 310 may be coupled with the display unit 201. The display adjust module 310 may be configured to adjust a brightness of the display, a contrast of the display, a colour of the display, a grey level of colour components of the display, and the like. A person skilled in the art will appreciated that properties of the display other than above-mentioned properties may be adjusted based on the effects of the light 204. The display adjust module 310 may be configured to adjust the level of luminance of the display based on one or more preferences of the user 202 along with effects of light 204. The one or more preferences of the user 202 may comprise an age of the user 202, conditions of the user 202, a display mode preferred by the user 202 or any combination thereof. For example, the readability of the content on the display may reduce with increased age of the user 202. The display may be adjusted to increase the brightness of the display. The conditions of the user 202 may comprise medical conditions such as cataract, corneal edema, and the like. The one or more preferences may be stored in a database 205 shown in FIG. 2B. The display adjust module 310 may retrieve the one or more user preferences from the database 205. The display adjust module 310 may be configured to adjust the level of luminance of the display or the content which is being displayed to a user 202 such that readability, visibility, and the like, of the content may be increased.

In an embodiment, the system 206 may comprise the analysis module 311, when the system 206 is implemented in an automobile. The analysis module 311 may be configured to analyses context information related to the automobile. The term "context information" may be defined as information related to the automobile required to determine a requirement of adjusting the level of luminance of display. The context information may comprise at least one of, direction of the automobile, speed of the automobile, a time data, and a location of the automobile. The term "time data" may refer to a time of a day, a timestamp, and the like. For example, the time of a day may be morning, afternoon, evening, and night. The timestamp may be 11:30. In another example, the timestamp may be 22:00. Further, the analysis module 311 may be configured to determine a requirement of adjusting the level of luminance of the display based on the analysis. For example, when the speed of the automobile is greater than a threshold value, the effects of the light 204 may vary significantly. The analysis module 311 may determine that adjusting the level of luminance of the display is not required, since the effects of the light 204 may be dynamically varying based on current environment of the automobile. Accordingly, the light 204 may not affect the user 202. In another example, when a time of a day is night, the analysis module 311 may determine that adjusting the level of luminance of the display is not required, since the display may not be affected due to the light 204 from the sun. Data related to the analysis may be stored as analysis data (not shown in Figure) in the memory 211.

The other data 306 may store data, including temporary data and temporary files, generated by the one or more modules 213 for performing the various functions of the computing unit 207. The one or more modules 213 may also include the other modules 312 to perform various miscellaneous functionalities of the computing unit 207. The other data 306 may be stored in the memory 211. It will be appreciated that the one or more modules 213 may be represented as a single module or a combination of different modules.

Figure 4:
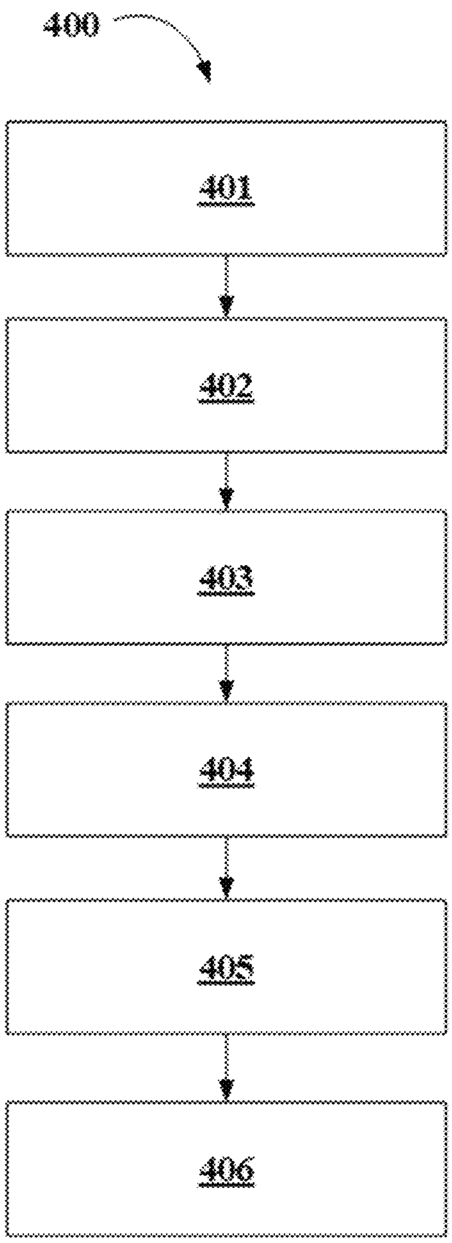
FIG. 4 shows an exemplary flow chart illustrating method steps for adjusting a display of a content for a user, in accordance with some embodiments of the present disclosure.

FIG. 4 shows an exemplary flow chart illustrating method steps to adjust the level of luminance the display or the content for the user 202, in accordance with some embodiments of the present disclosure. As illustrated in FIG. 4, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step 401, the display unit 201 displays the content to the user 202. The content displayed to the user 202 may be data such as text, image, video, and the like. In an example, when the display unit 201 may be associated with a vehicle, the content displayed to the user 202 may be information such as map, rear obstacle image, and the like. In another example, when the display unit 201 may be associated with a television, the content displayed to the user 202 may be entertainment, news, sports, and the like. A person skilled in the art will appreciate that the content displayed may be other than above-mentioned content displayed to the user 202.

At step 402, the capturing unit 203 captures the image 208 of the front view of the display unit 201. In an embodiment, the capturing unit 203 may capture an entire front view of the display unit 201. In another embodiment, the capturing unit 203 may capture one or more images to cover the entire front view. For example, the one or more images may be captured to capture a face of driver, and a person next to the driver.

At step 403, the computing unit 207 receives the image 208 from the capturing unit 203. The computing unit 207 may be configured with the capturing unit 203. The computing unit 207 and the capturing unit 203 may communicate over a communication network. In an example, when the display unit 201 is associated with a vehicle, the front view of the display unit 201 may comprise a driver, a person next to the driver, a seatbelt worn by the user 202, and the like. In another example, when the display unit 201 is associated with a television, the front view of the display unit 201 may comprise one or more users, one or more objects, and the like. In such embodiments, the computing unit 207 may be configured to receive one or more images of the front view of the display unit 201. In an embodiment, the computing unit 207 may receive the image 208 at pre-defined time intervals. In another embodiment, the computing unit 207 may receive the image 208 upon receiving an indication from the user 202. For example, the user 202 may provide the indication to the computing unit 207 when a readability of the content displayed on the display unit 201 is less, due to incidence of the light 204.

Figure 5A:
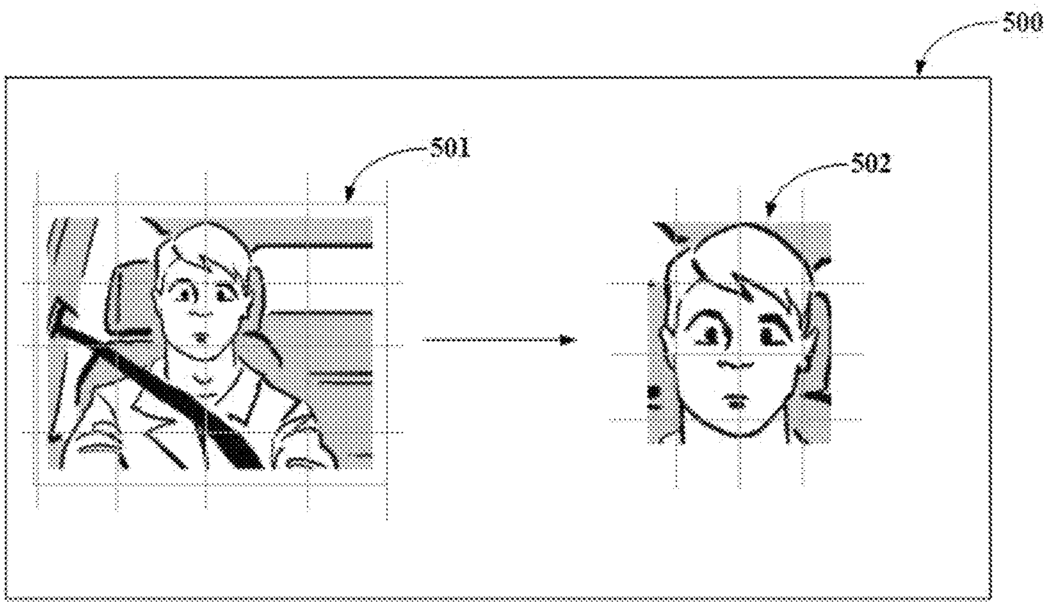
FIGS. 5A and 5B show exemplary illustration for determining one or more target regions, in accordance with some embodiments of the present disclosure.
Figure 5B:
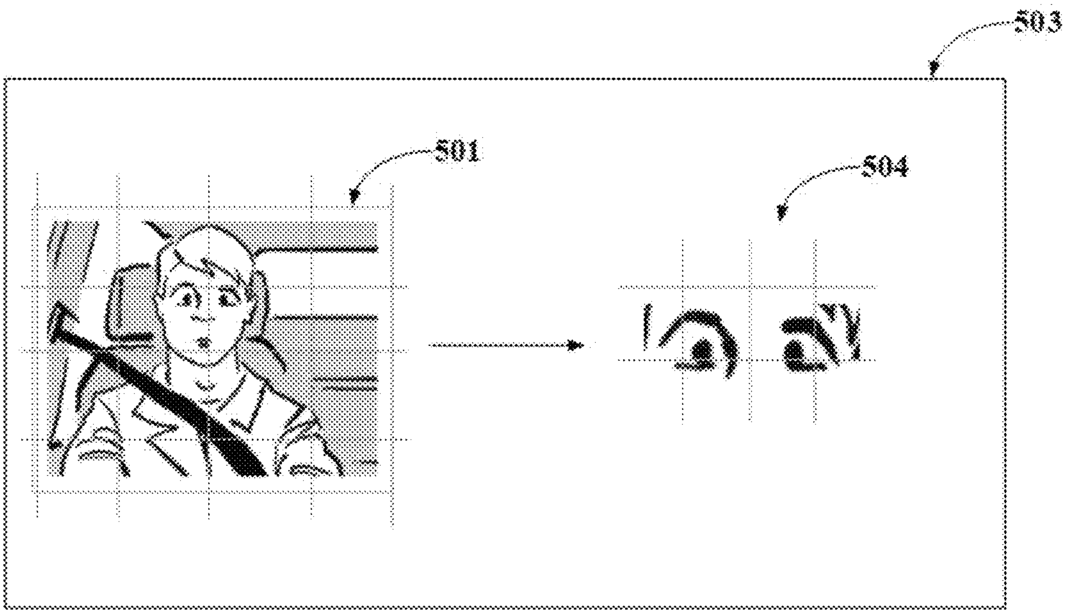

At step 404, the computing unit 207 determines the one or more target regions from the plurality of regions in the image 208. The one or more target regions may be determined based on a weightage assigned to each of the plurality of regions. The computing unit 207 may determine the one or more target regions from the plurality of regions by assigning the weightage based on a priority associated with the plurality of regions. Further, the computing unit 207 may select regions from the plurality of regions with the weightage greater than a pre-defined threshold value as the one or more target regions. The weightage assigned to a region from the plurality of regions is greater when the priority of the region is higher than other regions from the plurality of regions. The priority may be based on at least identification of the face of the user 202 and one or more facial organs of the user 202. A person skilled in the art will appreciate that any image processing technique may be used to determine the one or more target regions. Referring to example 500 FIG. 5A, the plurality of regions is represented as 501. The plurality of regions comprises the face of the user 202, the seatbelt, a seat, and the like. The computing unit 207 may determine the one or more target regions 502 as face of the user 202 based on the priority. Referring to example 503 of FIG. 5B, the computing unit 207 may determine the one or more target regions 502 as eyes of the user 202 based on the priority. In an embodiment, the weightage is assigned dynamically. For example, the weightage is dynamic based on a movement of head of the user 202.

At step 405, the computing unit 207 determines the effects of the light 204 incident on the one or more target regions. The effects of the light 204 may comprise the intensity of the light 204, the distribution of the light 204 on the one or more target regions, and the aperture of the iris in the eye of the user 202. The intensity of the light 204 may be an amount of energy transferred to the one or more target regions. The distribution of the light 204 may be a projected pattern of the light 204 on the one or more target regions. The aperture of the iris in the eye of the user 202 indicates dilation of the eye due to penetration of the light 204 through lens into retina in the eye. The computing unit 207 may use image processing techniques to determine each of the effects of the light 204 on the one or more target regions. For example, the intensity of the light 204 and the distribution of the light 204 may be determined from the histogram of the image 208. Computer vision techniques may be used to determine the aperture of the iris in the eye of the user 202. A person skilled in the art will appreciate that any known techniques may be used to determine each of the effects of the light 204.

At step 406, the computing unit 207 adjusts the display of the content for the user 202 based on the effects of the light 204. The computing unit 207 may be coupled with the display unit 201. The computing unit 207 may be configured to adjust at least one of a brightness of the display, a contrast of the display, a colour of the display, a grey level of color components of the display, and the like. For example, when the intensity of the light 204 is greater than a pre-determined threshold value, the brightness of the display may be increased. Further, the computing unit 207 may be configured to adjust the level of the luminance of the display based on one or more preferences of the user 202. The one or more preferences of the user 202 may comprise at least one of, an age of the user 202, conditions of the user 202, and a display mode preferred by the user 202. For example, the readability of the content on the display may reduce with increased age of the user 202. The display may be adjusted to increase the brightness of the display. The conditions of the user 202 may comprise medical conditions such as cataract, corneal edema, and the like. The one or more preferences may be stored in the database 205. The computing unit 207 may retrieve the one or more user preferences from the database 205. The computing unit 207 may be configured to adjust the level of the luminance of the display of the content such that readability, visibility, and the like, of the content may be increased. Further, the computing unit 207 may be configured to adjust the level of the luminance of the display of the content based on other information in the database 205, when the display is associated with the vehicle. The other information may comprise location and direction of the vehicle, travelling speed, time information, and the like.

Figure 6:
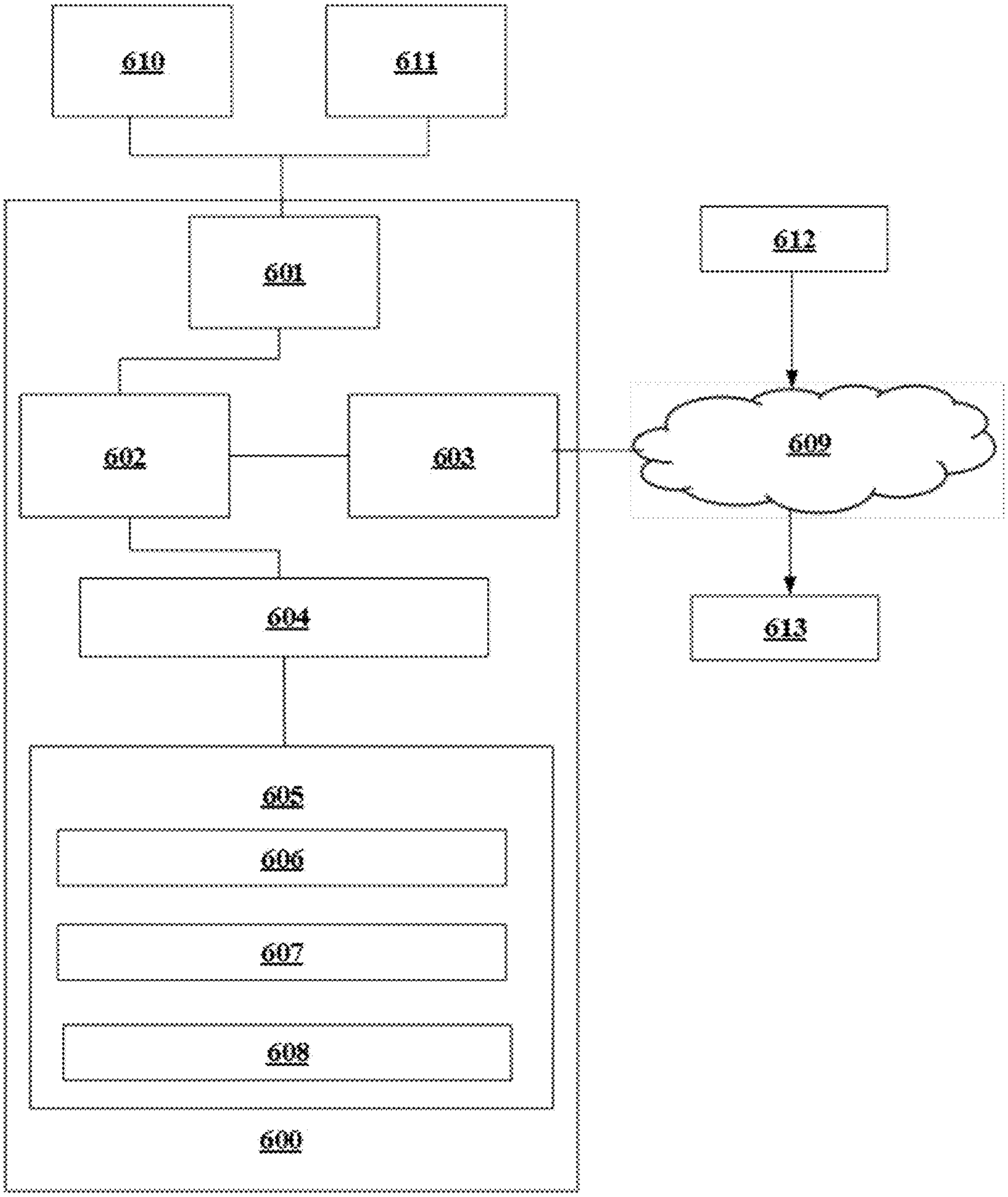
FIG. 6 shows a block diagram of a general-purpose computing system for adjusting a display of a content for a user, in accordance with embodiments of the present disclosure.

FIG. 6 illustrates a block diagram of an exemplary computer system 600 for implementing embodiments consistent with the present disclosure. In an embodiment, the computer system 600 may be used to implement the computing unit 207. Thus, the computer system 600 may be used to adjust the display of the content for the user 202. In an embodiment, the computer system 600 may receive the image 208 from the capturing unit 612 over the communication network 609. The computer system 600 may communicate with the display unit 613 over the communication network 609 The computer system 600 may comprise a Central Processing Unit 602 (also referred as "CPU" or "processor"). The processor 602 may comprise at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 600 is connected to the capturing unit 612 and the display unit 613 through a communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLER ANDROID™, BLACKBERRY® OS, or the like.

In some embodiments, the computer system 600 may implement the web browser 608 stored program component. The web browser 608 may be a hypertext viewing application, for example MICROSOFT® INTERNET EXPLORER™, GOOGLER CHROME™, MOZILLAR FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBER FLASH™, JAVASCRIPT™, JAVA™, Application Programming Interfaces (APIs), etc. In some embodiments, the computer system 600 may implement a mail server (not shown in Figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the present disclosure determine the one or more target regions based on a weightage. Since the weightage of the target regions is considered in the present disclosure, a measurement of illuminance is at required regions and accurate.

Further, the present disclosure considers the user preferences to adjust the level of luminance of the display. Since the accuracy of adjusting the level of luminance of the display is increased, the content is sharp and visible. This contributes to safe driving when the display is associated with the vehicles. Re-using the driver monitoring camera, saves additional cost of installation of a camera.

Further, the present disclosure uses image processing techniques for determining the effects of the light rather than using light sensors. Advantageously, additional cost of the light sensors is reduced. The effects of light measured using the light sensors may not be accurate since the light sensors may be placed at a distance from the user. The image processing techniques may increase accuracy in determining the effects of the light. Consequently, the system and method disclosed herein achieves the purpose of adjusting a level of luminance of a display according to an ambient lighting surrounding the display. Therefore, compensation of veiling glare is achieved.

Furthermore, the present disclosure determines a requirement of adjusting the level of luminance of the display based on analyzing of context information. The level of luminance of the display may be adjusted based on the requirement surrounding the display unit, which may vary from situation to situation. This is in particular practical and useful in automotive applications, where ambient lighting is subject to changes depending one whether the motor vehicle is in use during day time, subject to sunlight or night time, subject to street lights. Further thereto, since the display is adjusted only when there is a requirement, power of the system may be saved.

The terms “an embodiment”, “embodiment”, “embodiments”, “the embodiment”, “the embodiments”, “one or more embodiments”, “some embodiments”, and “one embodiment” mean “one or more (but not all) embodiments of the invention(s)” unless expressly specified otherwise.

The terms “including”, “comprising”, “having” and variations thereof mean “including but not limited to”, unless expressly specified otherwise.

The enumerated listing of items does not imply that any or all of the items are mutually exclusive, unless expressly specified otherwise. The terms “a”, “an” and “the” mean “one or more”, unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIG. 4 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system for adjusting a level of luminance of a display, wherein the system comprises:

a display unit configured to display a content;

a capturing unit configured to capture an image of a front view of the display unit, wherein the image is of a front-facing side of the display unit;

a computing unit coupled to the display unit and the capturing unit, wherein the computing unit is configured to:

receive the image from the capturing unit;

divide the image into a plurality of regions, each of the regions of the image having a substantially equal area;

determine one or more target regions from the plurality of regions in the image, based on a weightage of each of the plurality of regions;

determine effects of light incident on the one or more target regions; wherein the effects of the light comprises an intensity of the light, and distribution of the light on the one or more target regions, wherein the intensity of the light incident on the one or more target regions and the distribution of the light incident on the one or more target regions is determined from a histogram of the image;

adjust the level of luminance of the display based on the effects of the light;

analyse context information related to an automobile;

adjust the level of luminance of the display based on one or more preferences of a user, wherein the one or more preferences of the user comprises an age of the user and conditions of the user;

determine the one or more target regions from the plurality of regions by:

assigning the weightage based on a priority associated with the plurality of regions; and selecting regions from the plurality of regions with the weightage greater than a pre-defined threshold value as the one or more target regions, wherein the priority is based on at least an aperture of an iris of a user; and determine a requirement of adjusting the level of luminance of the display based on the analysis.

2. The system of claim 1, wherein the computing unit is configured to adjust the level of luminance of the display comprising adjusting a brightness of the display, a contrast of the display, a colour of the display, a grey level of colour components of the display or any combination thereof.

3. The system of claim 1, wherein the weightage assigned to a region from the plurality of regions is greater when the priority of the region is higher than other regions from the plurality of regions.

4. The system of claim 1, wherein the priority is based on at least identification of a face of the user.

5. The system of claim 1, wherein the context information comprises a direction of the automobile, speed of the automobile, a time data, a location of the automobile or any combination thereof.

6. The system of claim 1, wherein the one or more preferences of the user further comprise a display mode preferred by the user or any combination thereof.

7. The system of claim 1, wherein the weightage is assigned dynamically in response to a movement of a head of the user.

8. A method for adjusting a level of luminance of a display of using a system, the method comprising:

displaying a content, by a display unit;

capturing, by a capturing unit, an image of a front view of the display unit; wherein the image is of a front-facing side of the display unit;

receiving, by a computing unit, the image from the capturing unit and dividing the image into a plurality of regions, each of the regions of the image having a substantially equal area;

determining, by the computing unit, one or more target regions from the plurality of regions in the image based on a weightage of each of the plurality of regions;

determining, by the computing unit, effects of light incident on the one or more target regions;

wherein the effects of the light comprises an intensity of the light, and distribution of the light on the one or more target regions, wherein the intensity of the light incident on the one or more target regions and the distribution of the light incident on the one or more target regions is determined from a histogram of the image;

determining the one or more target regions from the plurality of regions by: assigning the weightage based on a priority associated with the plurality of regions; and selecting regions from the plurality of regions with the weightage greater than a pre-defined threshold value as the one or more target regions, wherein the priority is based on at least an aperture of an iris of a user;

adjusting, by the computing unit, the level of luminance of the display based on the effects of light;

analysing context information related to an automobile;

adjust the level of luminance of the display based on one or more preferences of a user, wherein the one or more preferences of the user comprises an age of the user and conditions of the user; and determining a requirement of adjusting the level of luminance of the display based on the analysis.

9. The method of claim 8, wherein adjusting the level of luminance of the display comprises adjusting a brightness of the display, a contrast of the display, a colour of the display, a grey level of colour components of the display or any combination thereof.

10. The method of claim 8, wherein the weightage assigned to a region from the plurality of regions is greater when the priority of the region is higher than other regions from the plurality of regions.

11. The method of claim 8, wherein the priority is based on at least identification of a face of the user.

12. The method of claim 8, wherein the context information comprises a direction of the automobile, a speed of the automobile, a time data, a location of the automobile or any combination thereof.

13. The method of claim 8, wherein the one or more preferences of the user further comprise a display mode preferred by a user or any combination thereof.

14. The method of claim 8, wherein the weightage is assigned dynamically in response to a movement of a head of the user.

* * * * *